United States Patent [19]

Seal

[11] Patent Number: 4,702,199

[45] Date of Patent: Oct. 27, 1987

[54] CALF TRIM CHUTE

[76] Inventor: Jack M. Seal, Rt. 1, Box 1762, Brazoria, Tex. 77422

[21] Appl. No.: 784,199

[22] Filed: Oct. 4, 1985

[51] Int. Cl.$^4$ .............................................. A01K 1/06
[52] U.S. Cl. ..................................................... 119/99
[58] Field of Search ....................... 119/20, 27, 98, 99, 119/103

[56] References Cited

U.S. PATENT DOCUMENTS

| | | | |
|---|---|---|---|
| 2,729,196 | 1/1956 | Breitenbach | 119/20 |
| 3,020,882 | 2/1962 | Browning | 119/99 |
| 3,858,555 | 1/1975 | Smith | 119/20 |
| 4,470,372 | 9/1984 | Norman | 119/27 |

*Primary Examiner*—Hugh R. Chamblee
*Attorney, Agent, or Firm*—Glwynn R. Baker

[57] ABSTRACT

There is disclosed a collapsible calf trim chute, also called a grooming chute, having a rectangular base fitted with a floor and a pair of upright pivoting rectangular members, one a head-stall-end and the other a tail-end member, each of which are pivotably swingable from a collapsed position on the base into an upright position, the rectangular end member frames being held apart laterally on each side of the chute, when in an upright position, by two-element brace-spacer members, fixedly pivotably swingably mounted near the top of each side of each head-stall-end and tail-end member, respectively, one of such pair of brace-spacer members configurations being of such construction as to permit the other side brace-spacer to be matingly engaged without disengagement of the first described brace-spacer member, a pair of telescoping side-movement restraining bars mounted between each upright end member on each side in a manner to provide freedom to allow angular positioning between the end members to permit grooming additionally, associated with head-stall-end frame member is a neck vise or head-stall mounted as well as a halter line member pivotably mounted on the same head-stall-end member near its top, the connections for maintaining the movable members in their fixed positions being by means of, for example, quick-acting removable pivot and securing pins, commonly tractor pins, set screws and the like.

5 Claims, 3 Drawing Figures

CALF TRIM CHUTE

BACKGROUND OF THE INVENTION

Trim chutes or grooming chutes, as they are often referred to, have in the past been cumbersome devices either permanently welded or bolted together to permit disassembly and transportation. However, these devices are usually made of steel and are heavy, and, even when made of a light metal such as aluminum, the construction makes it difficult for young people to assemble, even when several are available. With increased emphasis on the young people doing all that they can at the various livestock shows and with the fact that many times the youngster must get the animal ready with limited assistance from adults, it is becoming increasingly apparent that a light weight portable chute would be desirable.

The present invention provides a collapsible apparatus which can be handled by two young adults and assembled by one.

BRIEF DESCRIPTION OF THE INVENTION

In accordance with the present invention there is provided a collapsible calf trim chute, also called a grooming chute, having a rectangular base fitted with a floor, preferably an open mesh or expanded metal, although wood including plywoods, is acceptable. This floor may be permanently secured to the base or removable, and, if mesh like, it is preferably secured integral within base frame. Associated with each end of the base is an upright rectangular end member frame pivotably swingable into an upright position from each end of a rectangular base frame. One such member is provided with associated devices to hold the animals head via the neck to maintain the animal in a restrained position. This end is referred to as the head-stall-end. The other member is comprised of two uprights and a top cross bar, permitting unobstructed entry of the animal into the chute and is referred to as the tail-end member. Each end member has a top brace-spacer comprised of a pivotably mounted element, each pair on the same side of the apparatus being male/female matingly engagable with each other. One of such pair of brace-spacer members being of a mating male/female configuration of such a dimension as to permit the other side brace-spacer to be matingly engaged and/or disengaged without disengagement of the first described brace-spacer member. The top brace-spacer is provided with set screws or other securing means e.g. collars, etc. at the mating junction to secure them in a noncollapsible manner.

Associated braces are pivotably mounted on the base, secured to each upright of the head-stall end member by pins or bolts, preferably by quick-acting removable pivot and securing pins, conventionally tractor pins.

The head-stall-end member and the tail-end member have mounted on each side extending between the verticle frame members on the same side a horizontal vertically adjustable telescoping side-movement restraining member pivotably connected to a slide mounted on each upright member at each corner on a side. The construction of the side-restraint member in addition to being slidable on the end frame members is itself horizontally slidable (telescoping) allowing a freedom to address the grooming at any height without interference of the restraint bars, as well as, permit collasping of each end member onto the frame when transporting or storing without disassembly of the restraining members. These restraining bars may have telescoping position securing means but preferably, for ease of adjustment, do not have such means.

The final elements of the apparatus are a neck vise or "stall" for holding the animal in the chute. The neck vise consists of two bars each pivotably mounted on a cross-brace near the bottom of the head-stall-end frame and extend to the upper cross brace. One bar is adjustably fixedly secured to the top brace and the other is maintained in its neck restraining position by a self-weighted loaded pawl engaging a ratchet mounted on the upper cross bar. Other well known and widely used configurations on present day chutes which are not foldably collapsible are of course suitable. A halter line member is pivotably mounted on the same head-stall-end member near its top, pivoting forwardly and upwardly into a horizontal locked position.

The material of construction of each frame member is preferably aluminum, but magnesium may also be employed. While other metals are suitable from the strength standpoint and may be substituted for the light weight metal, particularily the top brace spacer, stall members, and/or halter line, they are heavy and reduce the ease of handling which is important to the young people grooming their own animals.

It is to be understood that all non-adjustable pivotal points and frame members may be welded or bolted together.

DETAILED DESCRIPTION OF THE INVENTION

Figure 1:
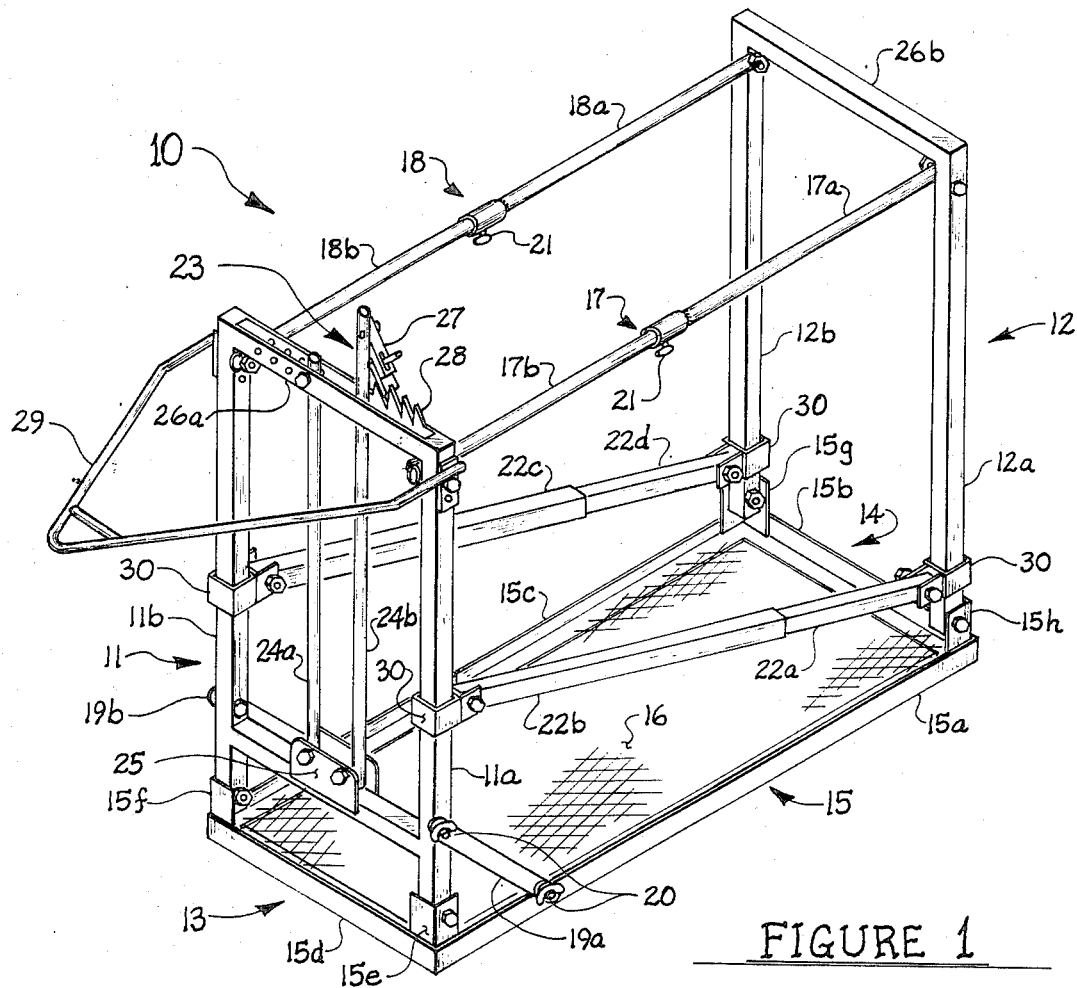
FIG. 1 represents in isometric view the trim chute in it fully assembled condition.
Figure 2:
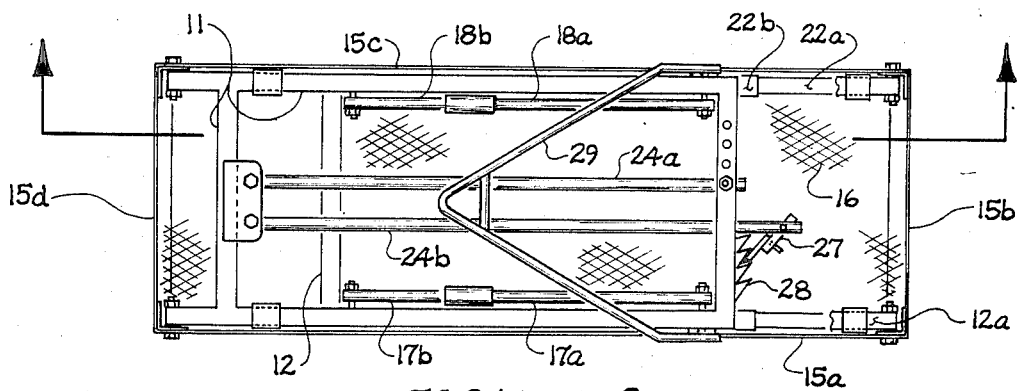
FIG. 2 represents a top view of the fully collapsed trim chute.
Figure 3:
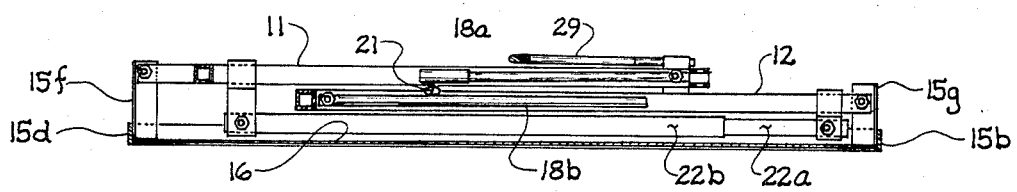
FIG. 3 represents a side view of the fully collapsed trim chute.

In accordance with the present invention there is provided a collapsible calf trim chute (10), also called a grooming chute, having a pair of upright parallel rectangular end member frames (11), the head-stall-end member, and (12) the tail-end member, pivotably swingable into an upright position from each end (13) and (14) of a rectangular base (15). The rectangular base (15) has a floor member (16) secured between the base member frames (15a, 15b, 15c, and 15d). Each end member (11) and (12) has mounted on each side a top brace-spacer (17) and (18) comprised of a pair of pivotably mounted members (17a) and (17b) and (18a) and (18b), respectively, matingly engageable with each other on the same side of the apparatus. One of such pair of brace-spacer members, e.g. (17) being of a mating, male/ female, configuration of such a dimension as to permit the other side brace-spacer (18) to be matingly engaged without disengagement of the first described male/female engaging brace-spacer member (17). The top brace-spacers (17) and (18) are provided with set screws (21) to secure them in a non-collapsable manner while the chute is in use.

Associated with at least the head-end member are a pair of braces (19a) and (19b) fastened pivotably on the base frame (15) corners secured to the vertical frame members (11a and 11b) of the end frame member (11) shown connected by bolt and nut but preferably by quick-acting removable pivot and securing pins (20), conveniently tractor pins.

The pair of end member frames also have vertically slidably mounted on each side of each verticle frame member (11a and 11b, 12a and 12b) a horizontal side-movement restraining bar (22a) and (22b), slidably telescoping and pivotably mounted on each upright end member (11a, 11b) and (12a, 12b), respectively, on each side. The construction of the side-restraint bars (22a, 22b, 22c, 22d) as both slidable and pivotable on the end frame members (11a, 11b) and (12a, 12b), respectively, and being itself horizontally slidable (telescoping) allows a freedom to address grooming without interference of the restraint bars as well as permit collasping of each end member (11) and (12) and onto the frame when transporting or storing.

The final elements of the apparatus are a neck vise (23), mounted within the head-stall-end member (11) having two spaced apart bars (24a and 24b) pivotably mounted on a horizontal brace (25) of the head-stall-end frame (11). One of the bars (24a) is adjustably fixed, as by bolts and nuts, to the upper cross member (26) of the head-stall-end member and the other (24b) being pivotably attached to the brace (25) at one end has a self weighted pawl (27) on the other end cooperatively associated with a rachet member (28) located in operative in operative position to the pawl on the upper brace (26) of the head-end member.

A halter line member (29) is pivotably mounted on the same end member near its top pivoting forward and upward to a horizontal position to enable the halter to be secured thereto to hold the animals head in a forward up-tending position.

It is to be understood that the trim chute is adaptable to any dimensions as for example a calf, sheep, hogs, large dogs, and colts or the like.

In a representative example of construction and suggested materials of construction of a trim chute for calves, the base member (15) was constructed from 2 inch by 2 inch by 3/16 inch aluminum angle. The regtangular dimensions were approximately 32 inches wide by 84 inches long. The corners were welded and a $\frac{3}{4}$ inch thick plywood floor (16) of the inside dimensions was laid down and fastened to the frame lateral leg of the angles of the base (15). In a recent version of the trim chute a piece of expanded aluminum was used instead of the plywood to form the floor. The replacement of the plywood with the expanded metal made cleaning of the floor easier. At each corner was welded to the inside upright leg of the base angle a short upright-standing angle, (15e, f, g and h) each of which had been drilled to receive a bolt for pivotably securing the head-stall-end (11) and tail-end (12) member respectively, at each end to the bolt and the verticle members preferably by quick connect pins on the verticle members, although for ease of illustration has been shown as a bolt and nut. The head-stall-end member (11) and the tail-end member (12) were each constructed from 1½ inch square aluminum tube stock having a wall thickness of about 0.125 inch. The verticle frame members (11a, 11b) and (12a, 12b) were 68 inches long and the cross-brace members (26a and b), one at the top of each pair of verticle members of the head-stall-end and the tail-end, respectively, and one (25) about 12 inches from the base on the head-stall end were likewise 1½ inch square tube stock about 28½ inches long welded in position. The bottom of each frame member of the head-stall-end member and the tail-end member was drilled to receive the bolt of each short upstanding leg (15f–h) at each corner of the base. Thus, when the nut was secured on the bolt each end member was pivotably mounted to swing as a unit from a collapsed position atop the frame to an upright position. A slide (30) was positioned on each verticle frame member before assembly. The slide was made from a 2 inch by 2 inch square aluminum tubing having a wall thickness of about 0.125 inch, which permitted the sleeve or slide to move freely on the verticle member. A four inch flat aluminum bar stock was welded to each side of each slide extending inwardly toward the opposite verticle member on the side. The bars were drilled to receive a bolt for pivotably securing the ends of the restraining members to the slide. A ½ inch hole was drilled through the slide on the outside of the slide and tapped to receive a ½ inch bolt to which a ½ inch rod had been welded to serve as a handle for tightening the bolt to fix the slide against movement when desired. Each side restraining member (22a–d) was made from two square aluminum tubes, one (22a, 22c) 1 inch and the other (22b, 22c) 1½ inch, allowing the former to be inserted into the latter providing the telescoping nature to the side restraining members. While not necessary, but optional, a securing device may be associated with the side restraining members to fix them in their telescoping state. While the side movement restraining members have been described and illustrated as an integral part of the collapsible unit, it is to be understood that they can be mounted in a totally removable manner, using a straped slides the open end closure by removable or hinged plate. The bracer-spacer member pairs (17, 18) were constructed from 1½ " schedule 40 pipe, one member of each having a 1½ " sleeve welded to its end to matingly engage the other member of the pair on a side. One of the sleeves being longer than the other to permit the other pair of brace-spacer members to be assembled and disassembled without disengaging the first pair. Each sleeve is provided with a pin which drops through the sleeve and the pipe which does not have the sleeve or singular securing means such as a wing set-screw, thereby securing the bracer-spacers in a fixed position to prevent collapse of the end members. Flat bar stock was employed to construct the head-stall-end base braces (19a, 19b), which are set at about 45 to 60 degrees to the horizontal from each head-stall-end verticle member to the base. The flat bar stock was ¼ inch by 2 inch about 12 inches long and was secured to the base by a bolt and wing-nut using appropriate washers, and at the verticle frame member by a tractor pin, bolt and nut or wing-nut, again with appropriate washers. The head-stall-end lower cross brace (21) had secured to it a flat ¼ by two inch wide bar stock welded to each side traversing the central portion and providing an anchor for the stall assembly, one member 24a of which was a 1 inch schedule 40 pipe bolted between the flat stock at one end and to the upper brace member of the head-stall-end, off-set from the centerline. The other stall member (24b), of similar diameter and material, was pivotably secured to the flat bar stock, again off-set from the centerline. The upper end of this member was provided with a self-weighted pawl (27) positioned to engage a horizontal rachet tooth of a rachet (28) welded to each side so the top brace member. The particular design of the pawl and rachet is not critical, but preferably is a self engaging and holding style enabling quick and easy locking but requires positive action by the operator to disengage it. Conveniently the embodiment constructed on the early model was a flat bar welded to a pair of flat bars which were bolted to the movable stall member and engaged a pair of toothed members welded to the top brace. The weight of the pawl being sufficient to maintain the pawl frictionally engaged against that once an animals neck was snugly pressed between the pivoting stall member and the fixed stall member the animal was restricted from backing out of the stall. The halter-line 29 member was constructed of ⅜ inch rod welded to a short flat stock bar at each end and the flat stock bar drilled to receive a bolt positioned just below the top brace member of the head-stall-end verticle frame members to provide a pivotal mounting for the halter-line to enable it to be swung from its stored position against the frame to a forward verticle position when the chut is opened up. The bolts and their respective nuts and appropriate washers secure the halter-line member in its horizontal position.

A trim chute made of the aforedescribed materials will maintain a large halter-trained show calf for grooming. Smaller or larger dimensional materials may be employed for larger and smaller livestock and/or domesticated show animals, with overall dimensions chosen to fit the animals size.

I claim:

1. A collapsible trim-chute consisting of a base member with a floor, a head frame member with a stall, a tail end frame member, the head frame member and tail end member each being pivotably mounted on the base member collapsible onto said base and each other, each of said head frame and said tail end member having pivotably mounted near their upper extremes a brace spacer member which matingly engages the brace spacer on the other member thereby to maintain said members in upright and spaced apart position when said trim chute is set-up, an animal side-movement restraining member slidably mounted on each side, said restraining member being capable of adjustable and fixed positioning on the frame and end members on each side, the stall of said head frame being adjustable vise like to receive an animals neck and lockable in pressure against said animals neck.

2. A trim chute as set forth in claim 1 wherein said animal restraining member is removably mounted on a side, and said head end frame has associated therewith a pivotably forward swinging halter line member.

3. A trim chute as set forth in claims 1 made of a light metal.

4. A trim chute as set forth in claims 1, 2 or 3 made of aluminum.

5. A collapsible calf trim chute, also called a grooming chute, as set forth in claim 1, comprised of a pair of upright rectangular parallel end member frames pivotably swingable into an upright position from each end of a rectangular base frame-work which has a floor member within the frame-work, the rectangular end member frames being held apart laterally on each side of the frame by two-element brace-spacer members pivotably swingably mounted to matingly engage with its opposite member on a side, one such pair of brace-spacer members mating configured and being of such dimension as to permit the other side brace-spacer to be matingly engaged without disengagement of the first described brace-spacer member, a pair of slidable brace member side movement restraining bars mounted between each upright end member on each side which bar has freedom to extend telescopingly for angular or parallel positioning between the end members and is adjustable vertically to permit grooming and pivoted at each end member to permit collapsing of each end member onto the frame when transporting or storing, and associated quick-acting removable pivot and securing pins, commonly tractor pins, set screws and other securing means, additionally associated with one end frame is a neck vise mounted within the frame member having two vertical bars pivoted at their lower end, one adjustably fixed at its upper end and time other adjustably fixed by a ratchet and pawl, and a halters line member pivotably mounted on the same end member near its top.

* * * * *